Aug. 13, 1935.                L. H. DYER                2,010,853
                               SHACKLE
                        Filed Aug. 25, 1934        2 Sheets-Sheet 1
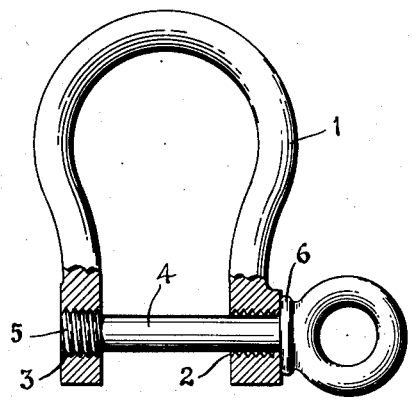
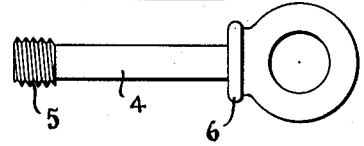
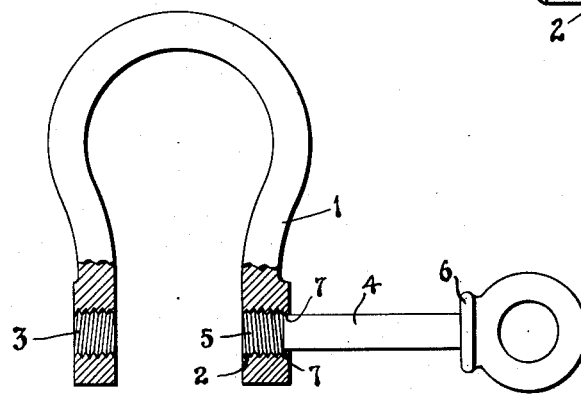
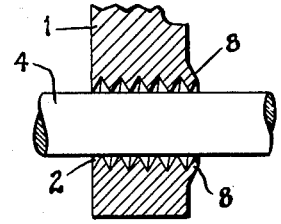
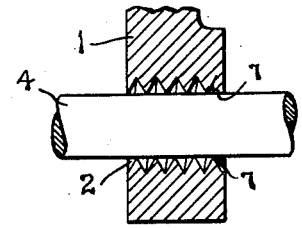
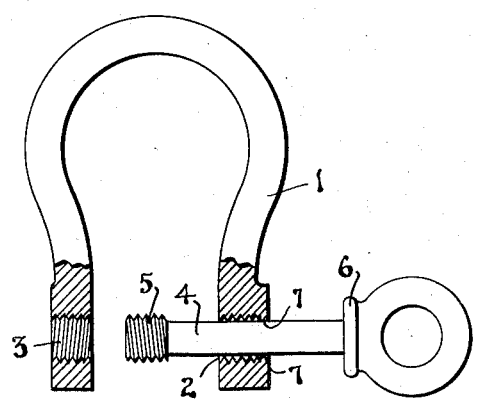
INVENTOR.
Leonard H Dyer Aug. 13, 1935.                L. H. DYER                2,010,853
                                SHACKLE
                         Filed Aug. 25, 1934          2 Sheets-Sheet 2
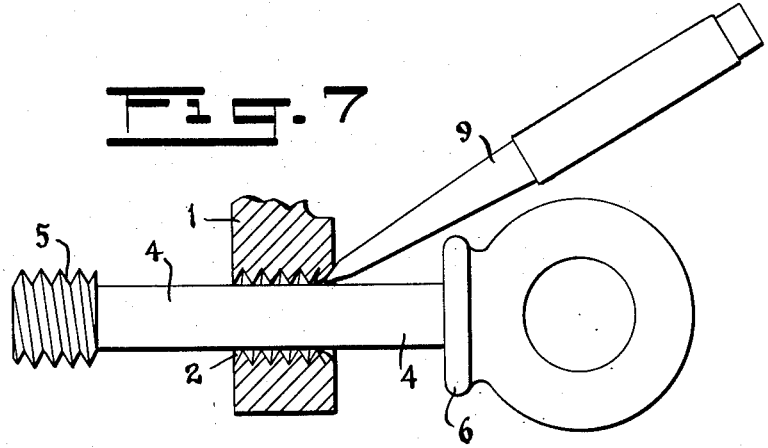
INVENTOR.
Leonard H. Dyer Patented Aug. 13, 1935

2,010,853

UNITED STATES PATENT OFFICE 2,010,853

SHACKLE

Leonard H. Dyer, New York, N. Y.

Application August 25, 1934, Serial No. 741,413

4 Claims. (Cl. 59—86)

The object I have in view, is the production of a shackle, or analogous device, in which the pin will be retained in the shackle, when open, and cannot be dropped or lost. In a pin shackle, it is desirable that the free end of the pin be secured to the bow so that the parts will not be separated under stress.

The usual pin shackle is made with a pin of uniform diameter, with its free end threaded. The bow has one opening threaded, and the other unthreaded, and of a larger size than the threaded opening, so that in assembling the shackle the threaded end of the pin is first pushed through the unthreaded opening, and then screwed into the threaded opening.

The other end of the pin has a collar, which bears against the outside of the bow. This secures the pin at both ends, and prevents the bow from spreading under stress.

The accompanying drawings show several embodiments of my invention.

Figure 1 is a view of a shackle, partly in section, showing an embodiment of my invention, the shackle being closed;

Fig. 2 is a similar view of the same, the shackle being open;

Fig. 3 is a similar view, the shackle being shown partly open;

Fig. 4 is a view of the pin;

Fig. 5 is an enlarged sectional view of one of the openings, showing the parts as they are, before the pin is locked in place;

Fig. 6 is a similar view after the pin is locked in place and;

Fig. 7 is a view of a modified means for locking the pin in place.

In all of the views like parts are designated by the same reference numerals.

In one embodiment of the invention the shackle comprises a bow 1, having two openings 2 and 3. Both openings are in alignment, and are of the same diameter. Both are threaded, the two threads being of identical pitch and depth.

The pin 4 has a threaded portion adjacent to its free end. This portion of the pin is of larger diameter than the remainder of the pin, which is unthreaded. The threads on the pin are of the same pitch and depth as the threads in the two openings, 2 and 3.

At the other end of the pin is a collar 6, and a handle, or other device for turning it.

When assembled as shown in Figure 1, the free end of the pin is screwed into the opening 3, and is thereby firmly held in place. The unthreaded portion of the pin extends from the threaded portion to the collar 6. A portion of it lies within the opening 2, and in close contact with the threads in that opening, thus taking the strain when in use.

In opening the shackle, the pin is first unscrewed from the opening 3, and is slid to the other limb of the bow, and then its threaded portion is screwed into the opening 2, thus leaving the shackle entirely open, as shown in Fig. 2. To prevent the pin from becoming entirely withdrawn, and thereby subject to becoming dropped or lost, the outer part of the thread in the first opening 2 is closed at 7. The pin is unscrewed to the point where its thread comes into contact with this closed portion 7, and therefore cannot be further removed, or withdrawn any further.

The closed portion of the thread in the opening 2 may be made in a number of ways. For example, the opening may be made as shown in Fig. 5, with a projecting lip 8. When the pin is introduced into the shackle the lip may be turned under, by means of a suitable tool, thus closing the thread.

In Fig. 7 the thread is closed by means of a suitable punch 9, or other tool, no lip 8 being necessary.

According to my invention, the shackle has all of the strength of the usual pin shackle, one end of the pin being secured to one limb of the bow by means of a positive lock. The other end of the pin is limited in movement by means of the collar 6, so that the shackle cannot become spread under stress. At the same time the pin cannot become accidently separated and dropped or lost.

While I have described my invention, as embodied in the form of a shackle, it is to be understood that the invention may be embodied in other structures, in which there is a pin, which may be introduced into place, and so arranged, with its free end locked in place, with provision to prevent entire removal from the rest of the device.

Having now described my invention, what I claim and desire to secure by United States Letters Patent is:

1. A shackle, in which the two openings are of the same diameter, and threaded with threads of the same pitch and depth, with a pin, having its free extremity enlarged, and threaded to engage with both openings the threads in the openings being of the same size diameter and pitch as those on the pin, and means associated with one of the openings, to prevent entire withdrawal of the pin.

2. A shackle, in which the two openings are of the same diameter, and threaded with threads of the same pitch and depth, with a pin, having its free extremity enlarged, and threaded to engage with both openings the threads in the openings being of the same size diameter and pitch as those on the pin, the thread of one opening being closed, to prevent entire withdrawal of the pin.

3. A shackle, comprising a bow, said bow having two openings, both openings being of the same diameter, and in alignment, the two openings being threaded with identical threads, the thread of the first opening being closed, short of the outside of the bow, a pin, said pin having an enlarged free end, said free end being threaded with thread adapted to engage with the threads of either of the two openings, when closed to engage with the thread of the second opening, when open to engage with the thread of the first opening, the closed portion of the thread abutting against the threaded portion of the pin, to prevent entire withdrawal of the pin.

4. A shackle, comprising a bow, said bow having two openings, both openings being of the same diameter, and in alignment, the two openings being threaded with identical threads, the thread of the first opening being closed, short of the outside of the bow, a pin, said pin having an enlarged free end, said free end being threaded with thread adapted to engage with the threads of either of the two openings, when closed, to engage with the thread of the second opening, when open, to engage with the thread of the first opening, the closed portion of the thread abutting against the threaded portion of the pin, to prevent entire withdrawal of the pin, that portion of the pin, which lies within the first opening, when the shackle is closed, being in close contact with the thread in that opening, thus taking the strain when in use.

LEONARD H. DYER.